(12) United States Patent
Chen et al.

(10) Patent No.: US 6,975,797 B2
(45) Date of Patent: *Dec. 13, 2005

(54) SINGLE AND MULTIPLE WAVELENGTH REFLECTION AND TRANSMISSION FILTER ARRANGEMENTS

(75) Inventors: Hongmin Chen, Acton, MA (US); Hamid R. Khazaei, Westford, MA (US)

(73) Assignee: Optovia Corporation, Acton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/776,810

(22) Filed: Feb. 11, 2004

(65) Prior Publication Data

US 2005/0175288 A1  Aug. 11, 2005

(51) Int. Cl.[7] .............................. G02B 6/26; G02B 6/28

(52) U.S. Cl. ......................................... 385/48; 385/24

(58) Field of Search ................... 385/24, 48; 372/29.02

(56) References Cited

U.S. PATENT DOCUMENTS

| | | | | |
|---|---|---|---|---|
| 4,482,203 A | * | 11/1984 | Stowe et al. ................... 385/30 |
| 4,483,582 A | * | 11/1984 | Sheem .......................... 385/24 |
| 6,052,394 A | | 4/2000 | Lee et al. ....................... 372/6 |
| 6,351,583 B1 | | 2/2002 | Bergmann et al. ............. 385/14 |
| 6,385,217 B1 | * | 5/2002 | Singh et al. .................... 372/20 |
| 6,400,860 B1 | | 6/2002 | Chandrasekhar et al. ..... 385/24 |
| 6,459,829 B1 | | 10/2002 | Yamauchi et al. ............. 385/24 |
| 6,525,872 B1 | | 2/2003 | Ziari et al. .................. 359/341.3 |
| 6,614,573 B1 | * | 9/2003 | Cao ........................... 359/246 |

FOREIGN PATENT DOCUMENTS

GB    2 158 649    * 11/1985    ............ H01Q 3/26

OTHER PUBLICATIONS

Book entitled "Fundamentals of Optical Waveguides" by K. Okamaoto, Published by Academic Press, 2000, pp. 161-165, and cited at p. 1 of the specification.

(Continued)

*Primary Examiner*—Frank G. Font
*Assistant Examiner*—Christopher M. Kalivoda
(74) *Attorney, Agent, or Firm*—Irwin Ostroff; Erwin W. Pfeifle

(57) ABSTRACT

A basic reflector arrangement has first and second power splitters. Each power splitter has first to fourth ports where the first port of the first power splitter is coupled to a remote signal source for receiving signals therefrom and providing feedback signals thereto. Signals received at each of the first and fourth ports of each power splitter are combined and split into first and second portions for transmission via the second and third ports, respectively, and signals received at the second and third ports are combined and split into first and second portions for transmission via the first and fourth ports, respectively. The second port of the second power splitter is coupled to provide an output signal from the reflector arrangement, and the first, third, and fourth ports thereof are coupled to the second, third, and fourth ports, respectively, of the first power splitter.

12 Claims, 5 Drawing Sheets

OTHER PUBLICATIONS

Paper entitled "Fiber Loop Reflectors" by D. B. Mortimore, Journal of Lightwave Technology, vol. 6, No. 7, Jul. 1988, at pp. 1212-1223, and cited at p. 1 of the specification.

Paper entitled "Optical Fiber Filter Comprising a Single-Coupler Fiber Ring (or Loop) and a Double-Coupler Fiber Mirror" by Y. H. Ja, Journal of Lightwave Technology, vol. 9, No. 8, Aug. 1991, pp. 964-974, and cited at p. 1 of the specification.

Paper entitled "Wavelength and intensity stabilization of 980nm diode lasers coupled to fibre Bragg gratings" by R. F. Ventrudo et al., Electronic Letters, Dec. 8, 1994, vol. 30, No. 25, at pp. 2147-2149.

Book entitled "Diode Lasers and Photonic Integrated Circuits" by L. A. Coldren and S. W. Corzine, Published by Wiley & Sons, 1995, pp. 252-257.

* cited by examiner

SINGLE AND MULTIPLE WAVELENGTH REFLECTION AND TRANSMISSION FILTER ARRANGEMENTS

CROSS-REFERENCE TO RELATED APPLICATIONS

This application is related to U.S. Ser. No. 10/776,808, which is entitled "High Efficiency Single And Multiple Wavelength Stabilized Laser System" (Optovia 6), has a common assignee and some common inventors with the present invention, and is being filed concurrently with the present invention.

FIELD OF THE INVENTION

The present invention relates to method and apparatus for providing multi-wavelength reflection filters that can be used, for example, in providing a feedback signal for stabilizing one or more lasers of a wavelength laser system.

BACKGROUND OF THE INVENTION

Devices, such as loop reflectors, ring resonators, or partial reflectors that reflect or return at least a portion of a transmitted signal back towards an originating generating source are well known in the art. In this regard see, for example, the book "Fundamentals of Optical Waveguides" by Katsunari Okamoto, Academic Press, 2000, at pages 160–165, describing ring resonators, "Fiber Loop Reflectors" by David B. Mortimore, Journal of Lightwave Technology, Vol. 6, No. 7, July 1988, pages 1217–1223, describing loop reflectors, and "Optical Fiber Filter Comprising a Single-Coupler Fiber Ring (or Loop) and a Double-Coupler Fiber Mirror" by Y. H. Ja, Journal of Lightwave Technology, Vol. 9, No. 8, August 1991, pages 964–974.

Referring now to FIG. 1, there is shown a schematic of an exemplary prior art loop reflector 10 comprising a 2×2 power splitter 11 and an optional delay line 12. The power splitter 11 has a first input/output port 11a that is coupled to receive a signal from a remote generating source (not shown) and return a reflected signal thereto via a path A, a second input/output port 11b, a third input/output port 11c, and a fourth input/output port 11d. The second and third input/output ports 11b and 11c are coupled to first and second input/output ports 12a and 12b, respectively, of the optional delay line 12 via respective paths B and C, and the fourth input/output port 11d thereof is coupled to provide an output signal from the loop reflector 10 via a path D to a downstream device (not shown).

In operation, a signal received at the first input/output port 11a of the power splitter 11 from the remote generating source via path A is split into first and second portions. The first portion is delivered to the second input/output port 11b and is transmitted via path B to the first input/output port 12a of the optional delay line 12. The second portion is delivered to the third input/output port 11c and is transmitted via path C to the second input/output port 12b of the optional delay line 12. Signals returned from the optional delay line 12 to the second and third input/output ports 11b and 11c of the power splitter 11 are each split into first and second portions, where the first portion is transmitted via path A back to the remote generating source, and the second portion is provided as the output from the loop reflector 10 via path D.

Referring now to FIG. 2, there is shown a schematic of an exemplary prior art two-port ring resonator 14 comprising a 2×2 power splitter 15. A first input/output port 15a of the power splitter 15 is coupled to receive a signal from a remote generating source (not shown) at a first input/output port 15a. A second input/output thereof 15b is coupled to provide an output signal from the ring resonator 14 via a path B to a downstream device (not shown). Third and fourth input/output ports 15c and 15d of the power splitter 15 are interconnected via a path C.

In operation, a signal received from the remote generating source at the first input/output port 15a of the power splitter 15 via path A is split into first and second portions with the first portion being delivered to the second input/output port 15b and transmitted via path B as the output signal from the ring resonator 14. The second portion is delivered to the third input/output port 15c and looped back to the fourth input/output port 15d via path C. When the second portion is received at the fourth input/output port 15d, it is split into first and second portions with the first portion being transmitted via the second input/output port 15b, and path B, as a component of the output signal from the ring resonator 14. The second portion is delivered to the third input/output port 15c and looped back to the fourth input/output port 15d via the path C to repeat the process. Each signal round trip in the loop, C, adds a component to the output signal. These components will add constructively or destructively at the output port, depending on signal wavelength. The resultant spectral response depends upon the coupling ratio and loop length.

Referring now to FIG. 3, there is shown a schematic of an exemplary four-port ring resonator 17 comprising first and second power splitters 18 and 19, respectively. Each of the first and second power splitters 18 and 19 have first, second, third and fourth ports 18a, 18b, 18c, and 18d, and 19a, 19b, 19c, and 19d, respectively, where the respective third and fourth input/output ports 18c and 18d, and 19c and 19d of the first and second power splitters 18 and 19, respectively, are coupled together. The first port 18a of the first power splitter 18 is coupled to receive a signal from a remote signal generating source via a path A. The signal received from path A is split into first and second portions where the first portion is directed to the second port 18b and provides an output signal from the ring resonator via a path B. The second portion is directed to the third port 18c and is transmitted via a path C to the third port 19c of the second power splitter 19. In the second power splitter 19, the signal received on path C is split into first and second portions where the first portion is directed to the first port 19a as a reflected signal from the ring resonator 17 via a path D. The second portion is directed to the fourth port 19d of the second power splitter 19 and is transmitted to the fourth port 18d of the first power splitter 18 via a path E where it is split; and first and second portions thereof are directed to the second and third input/output ports 18b and 18c, respectively. The second input/output port 19b of the second power splitter 19 would not normally have a signal directed thereto unless a signal was received at the second input/output port 18b of the first power splitter 18 from a remote device, or the first input/output port 19a of the second power splitter 19. Each signal round trip in the loop, optical path C→E, adds a component to the output signal at port 18b and to the reflect signal at port 19a. These components will add constructively or destructively at the output port 18b and reflection port 19a, depending on signal wavelength. The resultant spectral responses at the output port 18b and reflection port 19a depend upon the coupling ratios and loop length.

Partial reflectors have also been used in prior art stabilization systems as described in the copending application U.S. Ser. No. 10/776,808. In a prior art laser stabilization method, a laser source is coupled at its output to a reflection filter that selectively reflects back a part of the output of the laser sources toward the laser to stabilize the laser source's spectrum and power. The reflection filter sets both the wavelength and the amount of reflection used to feed back a signal to the laser source as found in, for example, Fiber Bragg Gratings (FBG) stabilized lasers. In such FBG system, the pump laser is connected to the FBG via a Polarization Maintaining (PM) optical fiber. The FBG provides the required reflection for stabilization of the FP laser chip. This method has been extensively used to stabilize a single laser source. Some multiple wavelength applications have also used this method to stabilize multiple laser sources using individual FBG for each laser source followed by a Wavelength Division Multiplexer (WDM) to combine stabilized laser source signals.

In an exemplary prior art stabilized laser system, an output/input facet of a laser is coupled to an input/output port of a transmission filter. The transmission filter is coupled at an output/input port thereof to an input/output port of a partial reflector. An output port of the reflector provides an output signal from the stabilized laser system. The transmission filter sets the wavelength, and the reflector sets the amount of signal reflection provided back through the transmission filter to the laser source. As was described in the copending application U.S. Ser. No. 10/776,808, when a portion of the signal filtered by the transmission filter is reflected by the reflector, it is again filtered by the transmission filter to provide a feedback signal to the output of the laser. It is found that, in response to the feedback signal, the laser source produces a wavelength shift in a first direction and generates an output signal that now peaks at a center wavelength that is shifted by an amount δw and is no longer at the desired wavelength output signal. As a result an excess loss is produced by the wavelength shift of the laser.

It is desirable to provide a reflection and transmission filter arrangement that can be used for various purposes as, for example, in a single or multiple laser stabilization system that reduces the excess loss for a single or multiple laser source stabilization system based on the use of a transmission filter of various technologies.

SUMMARY OF THE INVENTION

The present invention relates to reflection and transmission filter arrangements that can be used in various systems where a first portion of a received signal is passed to a downstream device, and a second portion is reflected back towards a source that is providing the received signal. Filtering devices that have a desired spectral response can be included in the reflector arrangement that will provide a reflected feedback signal back to a signal generating source (e.g., a laser).

From a first apparatus aspect, the present invention is a reflector arrangement comprising a first power splitter, and a second power splitter. The first power splitter comprises first, second, third, and fourth ports where the first port is adapted to be coupled to a remote signal source for receiving signals therefrom and providing feedback signals thereto. Signals received at each of the first and fourth ports are split into first and second portions for transmission via the second and third ports, respectively, and signals received at the second and third ports are split into first and second portions for transmission via the first and fourth ports, respectively. The second power splitter comprises first, second, third, and fourth ports, where the second port serves as an output of the reflector arrangement, and the first, third, and fourth ports are coupled to the second, third, and fourth ports, respectively, of the at least one first power splitter. Still further, signals received at each of the first and fourth ports thereof are split into first and second portions for transmission via the second and third ports, respectively, and signals received at the third port thereof are split into first and second portions for transmission via the first and fourth ports, respectively.

From a second apparatus aspect, the present invention is a reflector arrangement comprising a plurality of n first 2×2 power splitters, a broadband second power splitter, and first, second, and third multiplexer/demultiplexers. Each of the plurality of n first 2×2 power splitters comprises first, second, third, and fourth ports, where the each first port is adapted to be coupled to receive an output signal from a separate corresponding one of a plurality of n remote signal sources and providing feedback signals thereto. Signals received at each of the first and fourth ports thereof are split into first and second portions for transmission via the second and third ports, respectively, and signals received at the second and third ports thereof are split into first and second portions for transmission via the first and fourth ports, respectively. The second broadband power splitter comprises first, second, third, and fourth ports, where the second port serves as an output of the reflector arrangement. Signals received at each of the first and fourth ports thereof are split into first and second portions for transmission via the second and third ports, respectively, and a signal received at the third port thereof is split into first and second portions for transmission via the first and fourth ports, respectively. The first multiplexer/demultiplexer comprises a first filter spectral response, a plurality of n first ports, and a second port, where each of the plurality of n first ports is coupled to a second port of a corresponding one of the plurality of n first 2×2 power splitters, and the second port is coupled to the first port of the second broadband power splitter. The second multiplexer/demultiplexer comprises a second filter spectral response, a plurality of n first ports, and a second port, where each of the plurality of n first ports is coupled to the third port of a corresponding one of the plurality of n first 2×2 power splitters, and the second port is coupled to the third port of the second broadband power splitter. The third multiplexer/demultiplexer comprises a third filter spectral response, a plurality of n first ports, and a second port. Each of the plurality of n first ports is coupled to the fourth port of a corresponding one of the plurality of n first 2×2 power splitters, and the second port is coupled to the fourth port of the second broadband power splitter.

From a third apparatus aspect, the present invention is a reflector arrangement comprising first, second, and third power splitters. Each power splitter comprises first, second, third, and fourth ports. The first port of the first power splitter is coupled to receive a signal from, and to transmit a reflected signal back to, a remote signal generating source. The second, third, and fourth ports of the first power splitter are coupled to the first port of the second power splitter and the third and fourth ports of the third power splitter, respectively. The second port of the second power splitter serves as an output of the reflector arrangement, and the third and fourth ports are coupled to the first and second ports of the third power splitter. Signals received at each of the first and fourth input/output ports of each of the first, second, and third power splitters are split into first and second portions for transmission via the second and third ports, respectively, and signals received at each of the second and third ports is split into first and second portions for transmission via the first and fourth ports, respectively.

The invention will be better understood from the following more detailed description taken with the accompanying drawings and claims.

The drawings are not necessarily to scale.

DETAILED DESCRIPTION OF THE INVENTION

Figure 1:
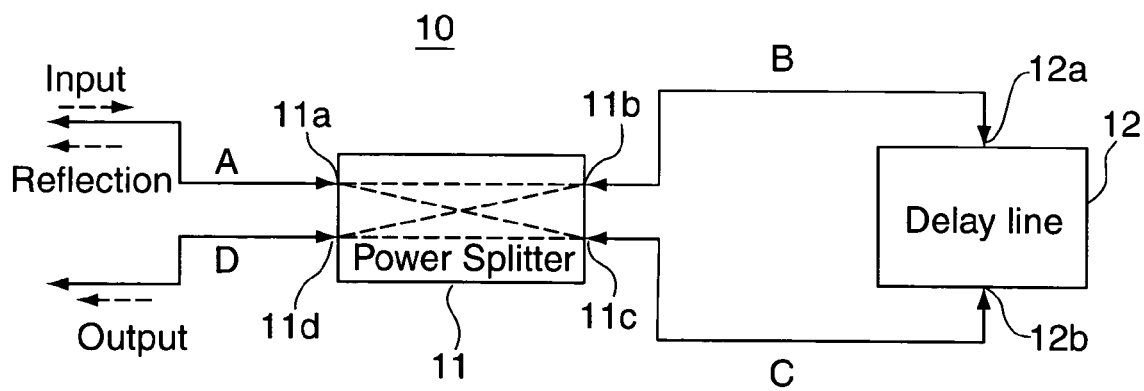
FIG. 1 shows a schematic of an exemplary prior art loop reflector comprising a 2×2 power splitter and an optional delay line.
Figure 2:
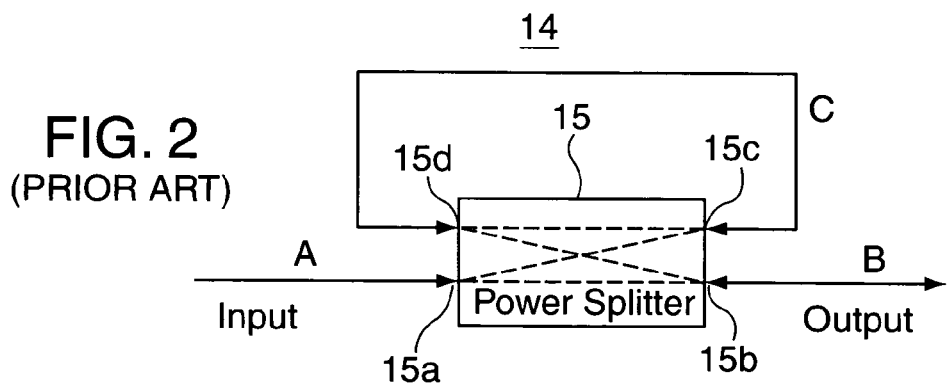
FIG. 2 shows a schematic of an exemplary prior art two-port ring resonator comprising a 2×2 power splitter.
Figure 3:
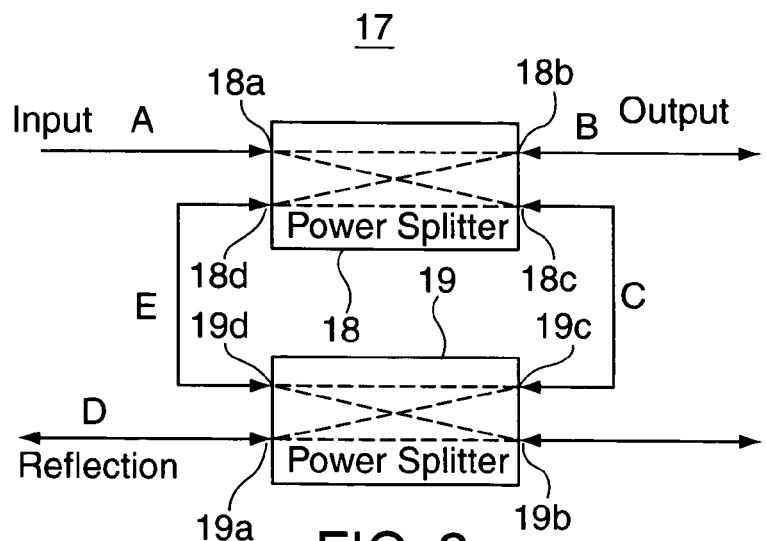
FIG. 3 shows a schematic of an exemplary four-port ring resonator comprising first and second power splitters.
Figure 4:
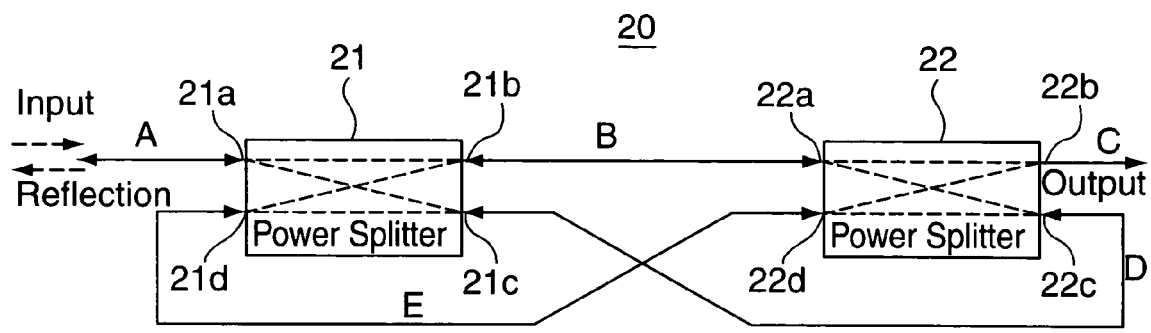
FIG. 4 shows a schematic of a simplified twisted loop reflector in accordance with the present invention.

Referring now to FIG. 4, there is shown a schematic of a simplified twisted loop reflector (arrangement) 20 in accordance with the present invention. The twisted loop reflector 20 comprises first and second power splitters 21 and 22. Each of the first and second power splitters 21 and 22 have first, second, third, and fourth input/output ports 21*a*, 21*b*, 21*c*, and 21*d* and 22*a*, 22*b*, 22*c*, and 22*d*, respectively. Port 21*b* serves an output of the reflector 20.

For the first power splitter 21, a first input/output port 21*a* thereof is coupled to receive signal or transmit signals to a signal generating device (not shown) via a path A; a second input/output port 21*b* thereof is coupled to a first input/output port 22*a* of the second power splitter 22 via a path B; a third input/output port 21*c* thereof is coupled to a third input/output port 22*c* of the second power splitter 22 via a path D; and a fourth input/output port 21*d* thereof is coupled to a fourth input/output port 22*d* of the second power splitter 22 via a path E. A second input/output port 22*b* of the second power splitter serves as a reflector 20 output and delivers output signals from the twisted loop reflector 20 via a path C to any predetermined downstream device (not shown).

In the operation of the twisted loop reflector 20, when a signal (e.g., from a laser not shown) is received at the input/output port 21*a* of the first power splitter 21 via path A it is split into first and second portions. The first portion thereof is transmitted via path B to the first input/output port 22*a* of the second power splitter 22 while the second portion thereof is transmitted via path D to the third input/output port 22*c* of the second power splitter 22.

In the second power splitter 22, the received signal at the first input/output port 22*a* via path B is split into first and second portions. The first portion is provided as an output signal from the twisted loop reflector 20 via path C to any predetermined downstream device. A second portion of the signal received at input/output port 22*a* is transmitted via the third input/output port 22*c* and path D to the third input/output port 21*c* of the first power splitter 21. The second portion from the first power splitter 21 received at the third input/output port 22*c* via path D is split into first and second portions. The first portion thereof is directed to the first input/output port 22*a* and via path B to the second input/output port 21*b* of the first power splitter 21. The second portion thereof is directed to the fourth input/output port 22*d* and via path E to the fourth input/output port 21*d* of the first power splitter 21.

In the first power spitter 21, signal portions received at the second input/output port 21*b* via path B and the third input/output port 21*c* via path D are each split into first and second portions, and the first portion of each split signal is directed to the first input/output port 21*a* and then via path A as a reflected signal to the exemplary laser (not shown) generating the original input signal to the twisted loop reflector 20. Similarly, the signal received at the fourth input/output port 21*d* via the path E is split into first and second portions, where the first portion is directed to the second input/output port 21*b* and via path B to the first input/output port 22*a* of the second power splitter 22 for processing therein. The second portion is directed to the third input/output port 21*c* and via path D to the third input/output port 22*c* of the second power splitter 22 for processing therein. Therefore, the path (A→B→C) provides the main component of the output signal from the twisted loop reflector 20. The output signal on path C has other components due to the introduction of these components by signals propagating in a cavity comprising a twisted loop configuration involving the paths D→E→D. Each signal round trip in this cavity adds one component to the output signal propagating on path D and one component to the feedback signal propagating on path A. A signal being reflected on path A to, for example, a laser (not shown) has two main components. A first main component in the feedback signal involves a round trip from the laser through the paths A→B→D→A, while a second main component in the feedback signal involves a round trip from the laser (not shown) through the paths A→D→B→A. All output signal components at output port 22*b*, or feedback signal components at input port 21*a*, add constructively or destructively depending upon signal wavelength. The resultant spectral responses at the output port 22*b* and the reflection port 21*a* depend upon coupling ratios and loop length.

Figure 5:
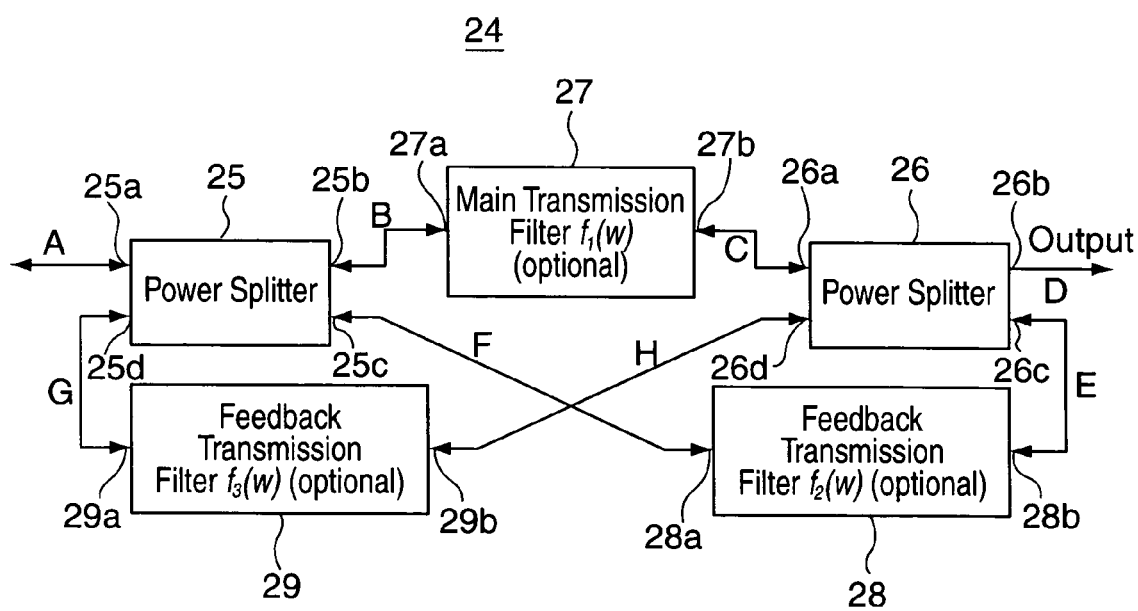
FIG. 5 shows a schematic of an exemplary twisted loop reflector in accordance with the present invention.

Referring now to FIG. 5, there is shown a schematic of an exemplary twisted loop reflector (arrangement) 24 in accordance with the present invention. The twisted loop reflector 24 comprises a first power splitter 25, a second power splitter 26, an optional main transmission filter 27, $f_1(w)$, an optional first feedback transmission filter 28, $f_2(w)$, and an optional second feedback transmission filter 29, $f_3(w)$.

For the first power splitter 25, a first input/output port 25*a* thereof is coupled to receive or transmit signals via a path A; a second input/output port 25*b* thereof is coupled to a first input/output port 27*a* of the optional main transmission filter 27 via a path B; a third input/output port 25*c* thereof is coupled to a first input/output port 28*a* of the optional first feedback transmission filter 28 via a path F; and a fourth input/output port 25*d* thereof is coupled to a first input/output port 29*a* of the optional second feedback transmission filter 29 via a path G. A second input/output port 27b of the optional main transmission filter 27 is coupled to a first input/output port 26a of the second power splitter 26 via a path C. The port 26b of the second power splitter 26 serves as an output of the reflector 24 and delivers output signals from reflector 24 via a path D to any predetermined downstream device (not shown); a third input/output port 26c thereof is coupled to a second input/output port 28b of the first optional feedback transmission filter 28 via a path E; and a fourth input/output port 26d thereof is coupled to a second input/output port 29b of the optional second feedback transmission filter 29 via a path H.

In the operation of the twisted loop reflector 24 when the main transmission filter 27 and the first and second feedback transmission filters 28 and 29 are present, a signal (e.g., from a laser not shown) received at the input/output port 25a of the first power splitter 25 via path A is split into first and second portions. The first portion thereof is transmitted via path B to the first input/output port 27a of the main transmission filter 27 while a second portion thereof is transmitted via path F to the first input/output port 28a of the first feedback transmission filter 28. The signal received by the main transmission filter 27, $f_1(w)$, is filtered and transmitted via path C to the first input/output port 26a of the second power splitter 26, where $f_1(w)$ represents a predetermined wavelength spectral response of the main transmission filter 27. In the second power splitter 26, the received signal at the first input/output port 26a is tapped and a first portion thereof is provided as an output signal from the reflector 24 via path D to any predetermined downstream device. A second portion of the signal received at input/output port 26a is transmitted via path E to the second input/output port 28b of the first feedback transmission filter 28. Therefore, the path (A→B→C→D) for the main component of the output signal from the reflector 24 involves the first power splitter 25, the main transmission filter, $f_1(w)$, 27, and the second power splitter 26. The output signal has other components due to the presence of a cavity comprising a twisted loop configuration involving the paths F→E→H→G→F. Each signal round trip in this cavity adds one component to the output signal propagating on path D. A feedback signal being reflected on path A to, for example, a laser (not shown) has two main components. A first main component in the feedback signal involves a round trip from the laser through the paths A→B→C→E→F→A, while a second main component in the feedback signal involves a round trip from the laser through the paths A→F→E→C→B→A. Each signal round trip in the cavity adds one component to the feedback signal propagating on path A. All output signal components at output port 26b, or feedback signal components at input port 25a, add constructively or destructively depending upon signal wavelength.

A signal passing through the first feedback transmission filter 28 is filtered with the wavelength filter spectral response $f_2(w)$, while a signal passing through the second feedback transmission filter 29 is filtered with the wavelength filter spectral response $f_3(w)$. A desired forward spectral response $F_o(w)$ at port 26b, and feedback spectral response $F_f(w)$ at port 25a, are achieved by a proper choice of the individual spectral responses $f_1(w)$, $f_2(w)$, and $f_3(w)$, coupling ratios, and cavity length. The broadband power splitter function for the first and second power splitters 25 and 26 can be achieved in different technology platforms such as planar waveguide technology using directional couplers (DC), multimode interference (MM) couplers, asymmetric Y junctions, Mach-Zehnder interferometers, etc., and free space optics using thin film, etc.

As was described in the copending U.S. Ser. No 10/776, 808. the proper choice of the $f_1(w)$, $f_2(w)$, and $f_3(w)$, coupling ratios, and cavity length provides a feedback signal to a laser that essentially compensates for a shift and excess loss normally incurred by the laser as a result of receiving a feedback signal as was described for a prior art laser stabilization system.

Figure 6:
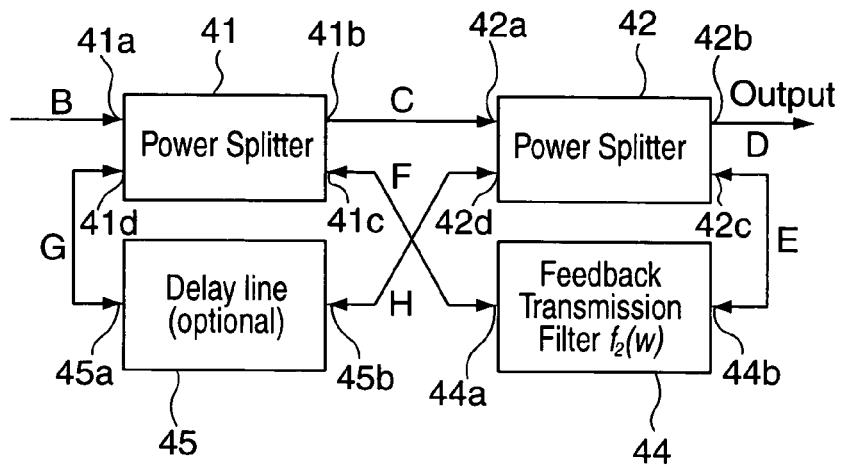
FIG. 6 shows a schematic diagram of an alternative twisted loop reflector arrangement to the twisted reflector arrangement shown in FIG. 5 in accordance with the present invention.

Referring now to FIG. 6, there is shown a schematic diagram of an alternative twisted reflector (arrangement) 40 to the twisted loop reflector 24 shown in FIG. 5 in accordance with the present invention. The twisted loop reflector 40 comprises a first power splitter 41, a second power splitter 42, a feedback transmission filter, $f_2(w)$, 44, and an optional delay line 45.

The description of the operation and the structuring for the twisted loop 24 of FIG. 5 is applicable to the operation and structuring of the twisted loop 40 of FIG. 6 except that the main transmission filter 27, $f_1(w)$, of twisted loop 24 of FIG. 5 is removed, and the second feedback transmission filter 29, $f_3(w)$, of twisted loop 24 of FIG. 5 is replaced by the optional delay line 45 in FIG. 6, and will not be repeated here.

Figure 7:
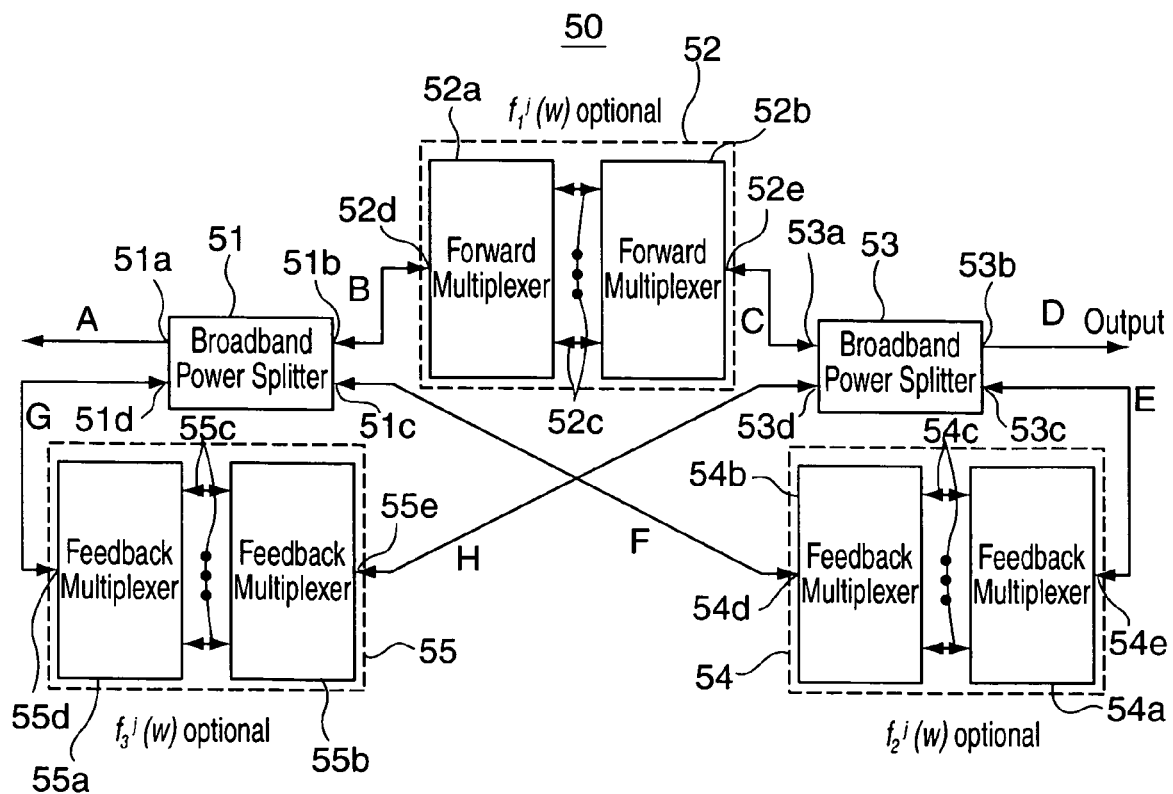
FIG. 7 shows a schematic diagram of an alternative twisted loop reflector arrangement for use with a broadband input signal in accordance with the present invention.

Referring now to FIG. 7, there is shown a schematic diagram of an alternative twisted loop reflector (arrangement) 50 preferably for use with a broadband input signal in accordance with the present invention. The twisted loop reflector 50 comprises a first broadband power splitter 51, an optional forward multiplexer/demultiplexer arrangement 52 (shown within a dashed line rectangle), $f_1^j(w)$, a second broadband power splitter 53, a first optional feedback multiplexer/demultiplexer arrangement 54 (shown within a dashed line rectangle), $f_2^j(w)$, and a second optional feedback multiplexer/demultiplexer arrangement 55, $f_3^j(w)$, (shown within a dashed line rectangle). The forward demultiplexer/multiplexer arrangement 52 comprises a first forward multiplexer 52a and a second feedback forward multiplexer 52b that are interconnected by a plurality of intermediate paths 52c. The first feedback demultiplexer/multiplexer arrangement 54 comprises a first feedback multiplexer 54a and a second feedback multiplexer 54b that are interconnected by a plurality of intermediate paths 54c. The second feedback demultiplexer/multiplexer arrangement 55 comprises a first feedback multiplexer 55a and a second feedback multiplexer 55b that are interconnected by a plurality of intermediate paths 55c. For the first broadband power splitter 51, a first input/output port 51a thereof is coupled to receive a broadband signal as, for example, a multiplexed signal from a plurality of lasers via an optical path A. A second input/output port 51b thereof is coupled to a first input/output port 52d of the forward demultiplexer/multiplexer arrangement 52 via a path B; a third input/output port 51c thereof is coupled to a first input/output port 54d of the first feedback demultiplexer/multiplexer arrangement 54 via a path F; and a fourth input/output port 51d thereof is coupled to a first input/output port 55d of the second feedback demultiplexer/multiplexer arrangement 55 via a path G.

For the second broadband power splitter 53, a first input/output port 53a thereof is coupled to a second input/output port 52e of the forward demultiplexer/multiplexer arrangement 52 via a path C; a second port 53b serves as an output of the reflector 50 and delivers output signals from reflector 50 to a predetermined downstream device (not shown) via a path D; a third input/output port 53c thereof is coupled to a second input/output port 54e of the first feedback demultiplexer/multiplexer arrangement 54 via a path E; and a fourth input/output port 53d thereof is coupled to a second input/ output port 55e of the second feedback demultiplexer/multiplexer arrangement 55 via a path H.

The description of the operation for the twisted loop 24 of FIG. 5 is applicable to the operation of the twisted loop 50 of FIG. 7 except that the main transmission filter 27, $f_1(w)$, first 28 and second 29 feedback transmission filters, $f_2(w)$ and $f_3(w)$, of twisted loop 24 of FIG. 5 are replaced with forward multiplexer/demultiplexer arrangement 52, $f_1^j(w)$, first feedback multiplexer/demultiplexer arrangement 54, $f_2^j(w)$, and second feedback multiplexer/demultiplexer arrangement 55, $f_3^j(w)$, in FIG. 7, and will not be repeated here.

In each of the forward, first feedback, and second feedback multiplexer/demultiplexer arrangements, 52, 54, and 55, a signal that is received at the first (52d, 54d, and 55d) input/output port thereof is demultiplexed, filtered, and then multiplexed and routed to the second (52e, 54e, and 55e) input/output port thereof. Similarly, a signal that is received at the second (52e, 54e, and 55e) input/output port thereof is demultiplexed, filtered, and then multiplexed and routed to the first (52d, 54d, and 55d) input/output port thereof.

Figure 8:
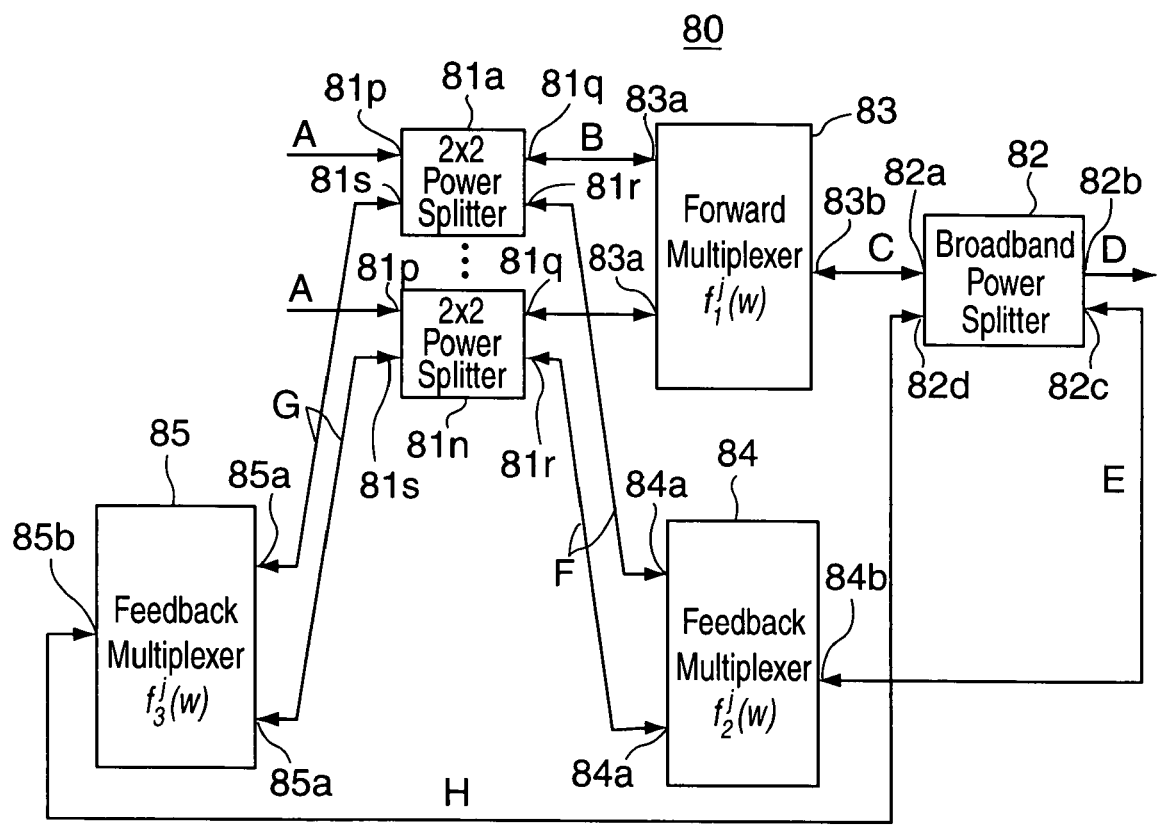
FIG. 8 shows a schematic diagram of an alternative twisted loop reflector arrangement to twisted loop reflector arrangement shown in FIG. 7 in accordance with the present invention.

Referring now to FIG. 8, there is shown a schematic diagram of an alternative twisted loop reflector arrangement 80 to the twisted loop reflector 50 shown in FIG. 7 in accordance with the present invention. The twisted loop reflector arrangement 80 comprises a plurality of n first 2×2 power splitters 81a–81n (with only 81a and 81n being shown), a broadband power splitter 82, a Forward Multiplexer, $f_1^j(w)$, 83, a first Feedback Multiplexer, $f_2^j(w)$, 84, and a second Feedback Multiplexer, $f_3^j(w)$. Each of the plurality of n first 2×2 power splitters 81a–81n comprises a first input/output port 81p that is coupled to receive a wavelength signal from a separate corresponding one of a plurality of n remote signal sources (e.g., a laser—not shown) via a path A. Each of the plurality of n first 2×2 power splitters 81a–81n further comprises a second input/output port 81q that is coupled to a separate corresponding one of a plurality of n first input/output ports 83a of the Forward Multiplexer 83 via paths B, a third input/output port 81r thereof is coupled to a corresponding one of a plurality of n first input/output ports 84a of the first Feedback Multiplexer 84 via paths F, and a fourth input/output port 81s thereof is coupled to a corresponding one of a plurality of n first input/output ports 85a of the second Feedback Multiplexer 85 via paths G.

For the broadband power splitter 82, a first input/output port 82a thereof is coupled to a second input/output port 83b of the Forward Multiplexer 83 via a path C; a second port 82b thereof serves as a reflector 80 output and delivers output signals from reflector 80 to a predetermined downstream device (not shown) via a path D, a third input/output port 82c thereof is coupled to a second input/output port 84b of the first Feedback Multiplexer 84 via a path E, and a fourth input/output port 82d is coupled to a second input/output port 85b of the second Feedback Multiplexer 85 via a path H.

In operation, each of a plurality of n wavelength signals from a plurality of n remote sources (not shown) is received via a separate one of the paths A at a first input/output port 81p of a corresponding one of the plurality of n 2×2 power splitters 81a–81n. In each of the power splitters 81a–81n, a signal received at the first input/output port 81p is split into first and second portions that are routed via input/output ports 81q and 81r, respectively, to a respective corresponding one of the plurality of n first input/output ports 83a of the Forward Multiplexer, $f_1^j(w)$, 83, and a corresponding one of the plurality of n first input/output ports 84a of the first Feedback Multiplexer, $f_2^j(w)$, 84. In the Forward Multiplexer 83, the signals received at the plurality of n first input/output ports 83a are filtered with the spectral response $f_1^j(w)$ and multiplexed to generate a multiplexed output signal for transmission via the path C to the first input/output port 82a of the broadband power splitter 82. In the broadband power splitter 82, the multiplexed signal received via path C at the first input/output port 82a is split into first and second portions where the first portion is transmitted via the second port 82b and path D, while the second portion is transmitted via the third input/output port 82c and path E to the second input/output port 84e 84b of the first feedback multiplexer 84. In the first Feedback Multiplexer 84, signals received at the plurality of n first input/output ports 84a are both filtered with the spectral response $f_2^j(w)$ and multiplexed to generate a multiplexed output signal for transmission via the path E to the third input/output port 82c of the broadband power splitter 82. Concurrently, the multiplexed signal received by the first Feedback Multiplexer 84 at the second input/output port 84b via path E is both filtered with the spectral response $f_2^j(w)$ and demultiplexed to generate a plurality of n output signals for transmission via separate ones of the paths F to the third input/output port 81r of a corresponding one of the plurality of n 2×2 power splitter 81a–81n. The multiplexed signal received by the broadband power splitter 82 via path E is split into first and second portions. The first portion is directed to the first input/output port 82a thereof and via path C to the Forward Multiplexer 83 where the first portion is demultiplexed and filtered with the spectral response $f_1^j(w)$ and each of the plurality of n demultiplexed signals is transmitted to the second input/output port 81q of a corresponding one of the plurality of n 2×2 power splitters 81a–81n. The second portion from the Broadband power splitter 82 is transmitted via the fourth input/output port 82d and the path H to the second input/output port 85b of the second feedback multiplexer 85. In each of the plurality of n 2×2 power splitters 81a–81n, signals received at its second and third input/output ports 81q and 81r are combined and then split into first and second portions where the first portion is transmitted as a feedback signal via the path A to the originating remote source, and the second portion is transmitted to a corresponding one of the plurality of n input/output ports 85a of the second feedback multiplexer 85. In the second feedback multiplexer 85, signals received at the plurality of n first input/output ports 85a are both filtered using the spectral response $f_3^j(w)$ and multiplexed into a multiplexed output signal from the input/output port 85b thereof to the fourth input/output port 82d of the broadband power splitter 82, and vice versa.

The path (A→B→C→D) for the main component of the output signal from the reflector 80 involves each of the plurality of n 2×2 power splitters 81a–81n, the Forward Multiplexer, $f_1^j(w)$, 83, and the broadband power splitter 82. The output signal has other components due to the presence of a cavity comprising a twisted loop configuration involving the paths F→E→H→G→F. Each signal round trip in this cavity adds one component to the output signal propagating on path D. A feedback signal being reflected on path A to, for example, a laser (not shown) has two main components. A first main component in the feedback signal involves a round trip from the laser through the paths A→B→C→E→F→A, while a second main component in the feedback signal involves a round trip from the laser through the paths A→F→E→C→B→A. Each signal round trip in this cavity adds one component to the reflected signal propagating on path A. All output signal components on path D or feedback signal components on path A add constructively or destructively depending upon signal wavelength. The resultant spectral responses at the output port 82b and the reflect port 81p depend upon spectral responses $f_1^j(w)$, $f_2^j(w)$, and $f_3^j(w)$, coupling ratios, and loop length.

Figure 9:
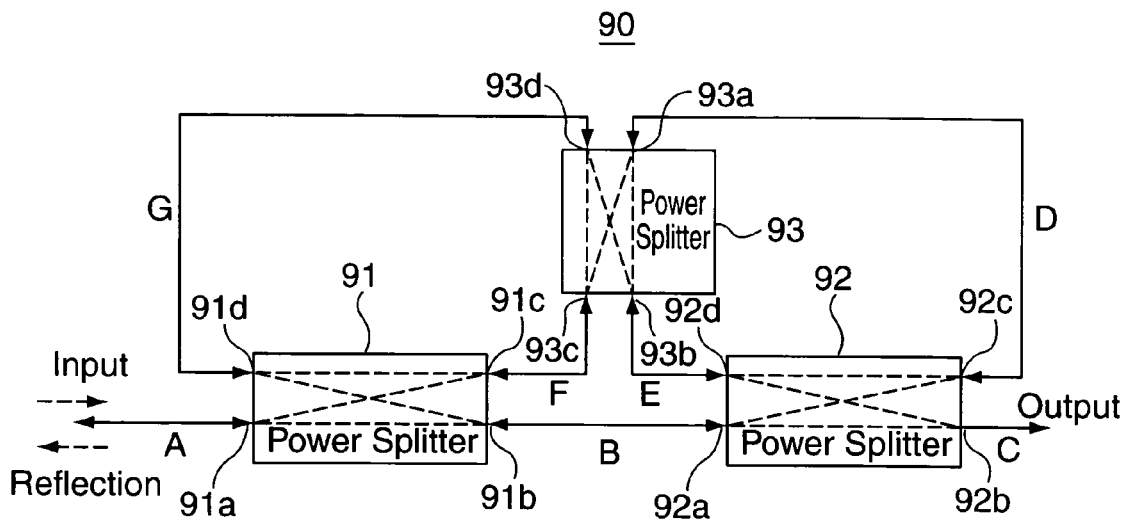
FIG. 9 shows a schematic of a coupled ring reflector in accordance with the present invention.

Referring now to FIG. 9, there is shown a schematic of a coupled ring reflector 90 in accordance with the present invention. The ring reflector 90 comprises first, second, and third power splitters 91, 92, and 93, respectively.

For the first power splitter 91, a first input/output port 91a is coupled to receive an output signal from, and transmit a reflected signal to, a remote signal generating source (e.g., one or more lasers not shown) via a path A. A second input/output port 91b thereof is coupled to a first input/output port 92a of the second power splitter 92 via a path B; a third input/output port 91c thereof is coupled to a third input/output port 93c of the third power splitter 93 via a path F; and a fourth input/output port 91d thereof is coupled to a fourth input/output port 93d of the third power splitter 93 via a path G.

For the second power splitter 92, a second input/output (or just an output) port 92b serves as an output of reflector 90 and delivers output signals from reflector 90 to a downstream device (not shown) via a path C; a third input/output port 92c thereof is coupled to a first input/output port 93a of the third power splitter 93 via a path D; and a fourth input/output port 92d thereof is coupled to a second input/output port 93b of the third power splitter 93 via a path E.

In operation, in each of the first, second, and third power splitters 91, 92, and 93, signals that are received at the first (91a, 92a, and 93a) and fourth (91d, 92d, and 93d) input/output ports thereof are split into first and second portions where the first portion is directed to the second input/output ports 91b, 92b, and 93b thereof, and the second portion is directed to the third input/output ports 91c, 92c, and 93c thereof. Similarly, signals that are received at the second (91b, 92b, and 93b) and third (91c, 92c, and 93c) input/output ports thereof are split into first and second portions where the first portion is directed to the first input/output ports 91a, 92a, and 93a thereof, and the second portion is directed to the fourth input/output ports 91d, 92d, and 93d thereof. Therefore, a signal received via path A at the first input/output port 91a of the first power splitter 91 is split into first and second portions with the first portion being directed to the first input/output port 92a of the second power splitter 92 via path B, and the second portion being directed to the third input/output port 93c of the third power splitter 93 via path F. The first portion signal received at the first input/output port 92a of the second power splitter is split into first and second portion with the first portion being sent as the output signal from the ring reflector 90 via path C, and the second portion being sent via path D to the first input/output port 93a of the third power splitter. The second portion received at the first input/output port 93a of the third power splitter 93 via path D is split into first and second portions with the first portion being directed to the second input/output port 93b thereof and via path E to the fourth input/output port 92d of the second power splitter 92. The second portion received at the first input/output port 93a of the third power splitter 93 via path D is directed to the third input/output port 93c thereof and via path F to the third input/output port 91c of the first power splitter 91. As was described hereinabove, any signal received at the third input/output port 91c of the first power splitter 91 is split into first and second portions which are directed to the first and fourth input/output ports 91a and 91d, thereof, respectively. Similarly, any signal received at the fourth input/output port 91d of the second power splitter 92 is split into first and second portions which are directed to the second and third input/output ports 92b and 92c, thereof, respectively. Therefore, the reflector 90 includes a first loop including the paths F and G, and a second loop including the paths D and E where portions of the looping signal in each of the first and second loops adds a component into the reflected signal and the output signal appearing on paths A and C, respectively, during each pass through the loop. All output signal components at output port 92b, or feedback signal components at input ports 91a, add constructively or destructively depending upon signal wavelength. The resultant spectral responses at the output port 92b and the reflection port 91a depend upon coupling ratios and loop length.

Figure 10:
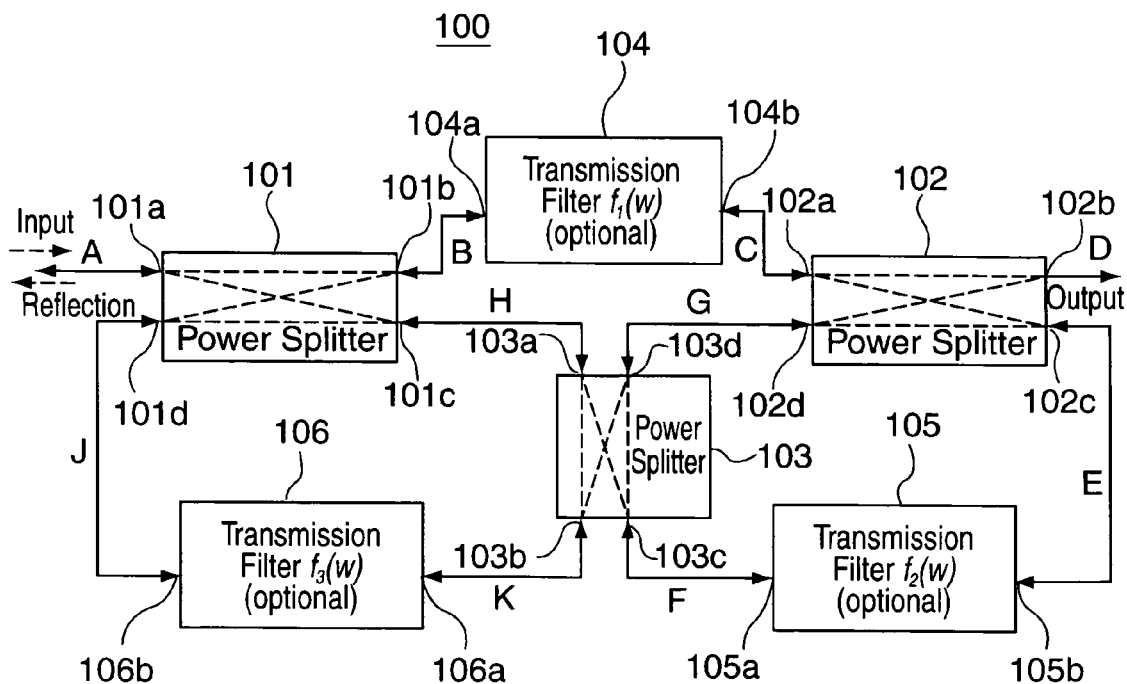
FIG. 10 shows a schematic of a coupled ring reflector in accordance with the present invention.

Referring now to FIG. 10, there is shown a schematic of a coupled ring reflector 100 in accordance with the present invention. The coupled ring reflector 100 comprises first, second, and third 2×2 power splitters 101, 102, and 103, an optional first transmission filter, $f_1(w)$, 104, an optional second transmission filter, $f_2(w)$, 105, and an optional third transmission filter, $f_3(w)$, 106.

For the first power splitter 101, a first input/output port 101a is coupled to receive an output signal from, and transmit a reflected signal to, a remote signal generating source (e.g., one or more lasers not shown) via a path A. A second input/output port 101b thereof is coupled to a first input/output port 104a of the first transmission filter 104 via a path B; a third input/output port 101c thereof is coupled to a first input/output port 103a of the third power splitter 103 via a path H; and a fourth input/output port 101d thereof is coupled to a second input/output port 106b of the third transmission filter via a path J.

For the second power splitter 102, a first input/output port 102a is coupled to receive an output signal from a second input/output port 104b of the first transmission filter 104 via a path C. A second input/output port 102b thereof is coupled to provide an output signal from the coupled ring reflector 100 to a downstream device via a path D; a third input/output port 102c thereof is coupled to a second input/output port 105b of the second transmission filter 105 via a path E; and a fourth input/output port 102d thereof is coupled to a fourth input/output port 103d of the third power splitter 103 via a path G.

For the third power splitter 103, a second input/output port 103b thereof is coupled to a first input/output port 106a of the third transmission filter 106 via a path K, a third input/output; port 103c thereof is coupled to a first input/output port 105a of the second transmission filter 105 via a path F.

The operation of the coupled ring reflector 100 is very similar to that described hereinabove for the coupled ring reflector 90 of FIG. 9. The main difference is that in the coupled ring reflector 100, a signal propagating between first and second power splitters 101 and 102 is optionally filtered using a spectral response of $f_1(w)$ by the first transmission filter 104. Still further, a signal propagating in a first loop including paths H→K→J→H is filtered by the third transmission filter with a spectral response of $f_3(w)$, while a signal propagating in a first loop including paths H→K→J→H is filtered by the second transmission filter with a spectral response of $f_2(w)$. Without the first, second, and third transmission filters 104, 105, and 106, the arrangement and operation of the coupled ring reflector 100 is the same as that of the coupled ring reflector 90 of FIG. 9.

It is to be appreciated and understood that the specific embodiments of the present invention that have been described are merely illustrative of the general principles of the present invention. Various modifications may be made by those skilled in the are that are consistent with the principles of the present invention. For example, a basic configuration of the twisted loop and ring reflector arrangements of the present invention comprise first and second power splitters that are coupled in a somewhat pretzel-like arrangement, and various components such as delay lines, and transmission filters or multiplexers that filter a signal passing therethrough with a predetermined spectral response can be inserted in the various paths of the somewhat pretzel-like arrangement depending on the type of reflected signal that is desired. For example, as described in the copending application U.S. Ser. No. 10/776,808, the spectral responses of the feedback transmission filters or feedback multiplexers are designed to provide a feedback signal to one or more laser sources that is shifted in a direction opposite to a shift normally produced in the laser from a feedback signal as is found in prior art laser stabilization systems. Still further, when in the specification the terms couple, or coupling, or couples are used, it is meant to describe that two components (devices) are connected together, either directly, or through some third element. Additionally, delay lines can be inserted into any of the feedback signal paths where components are required in the feedback signal for controlling the signal source as, for example, to place a laser in a stable "coherence collapse" mode as is well known in the prior art.

What is claimed is:

1. A reflector arrangement comprising:
    a first power splitter comprising first, second, third, and fourth ports with the first port being adapted to be coupled to an at least one remote signal source for receiving signals therefrom and providing feedback signals thereto, where signals received at each of the first and fourth ports are split into first and second portions for transmission via the second and third ports, respectively, and signals received at each of the second and third ports are split into first and second portions for transmission via the first and fourth ports, respectively; and
    a second power splitter comprising first, second, third, and fourth ports with the second port serving as an output of the reflector arrangement, and the first, third, and fourth ports being coupled to the second, third, and fourth ports, respectively, of the first power splitter and signals received at each of the first and fourth ports are split into first and second portions for transmission via the second and third ports, respectively, and a signal received at the third port is split into first and second portions for transmission via the first and fourth ports, respectively.

2. The reflector arrangement of claim 1 further comprising:
    a first transmission filter comprising a first spectral response that is coupled between the second port of the first power splitter and the first port of the second power splitter; and
    a second transmission filter comprising a second spectral response that is coupled between the third ports of the first and second power splitters.

3. The reflector arrangement of claim 2 further comprising a third transmission filter comprising a third spectral response that is coupled between the fourth ports of the first and second power splitters.

4. The reflector arrangement of claim 1 wherein:
    the received signal from the at least one remote signal source is a multiplexed wavelength signal comprising a plurality of n multiplexed wavelength output signals from a plurality of n remote signal sources;
    the first power splitter and the second power splitter are each individual broadband power splitters; and
    the reflector arrangement further comprising:
    a first multiplexer/demultiplexer arrangement comprising a first filter spectral response that is coupled between the second port of the first broadband power splitter and the first port of the second broadband power splitter, where the first multiplexer/demultiplexer arrangement comprises a pair of multiplexer/demultiplexers that are coupled to demultiplex a received multiplexed signal at one end and then multiplex the demultiplexed signal for transmission at an other end thereof; and
    a second multiplexer/demultiplexer arrangement comprising a second filter spectral response that is coupled between the third ports of the first and second broadband power splitters, where the second multiplexer/demultiplexer arrangement comprises one of a group consisting of a single multiplexer/demultiplexer and a pair of multiplexer/demultiplexers that are coupled to demultiplex a received multiplexed signal at one end and then multiplex the demultiplexed signal for transmission at an other end thereof.

5. The reflector arrangement of claim 4 further comprising:
    a third multiplexer/demultiplexer arrangement comprising a third filter spectral response that is coupled between the fourth ports of the first and second broadband power splitters, where the third multiplexer/demultiplexer arrangement comprises a pair of multiplexer/demultiplexers that are coupled to demultiplex a received multiplexed signal at one end and then multiplex the demultiplexed signal for transmission at an other end thereof.

6. The reflector arrangement of claim 1 further comprising a third power splitter comprising first, second, third, and fourth input/output ports, the first and second input/output ports being coupled to the third and fourth input/output ports, respectively, of the second power splitter and the third and fourth input/output ports being coupled to the third and fourth input/output ports of the at least one first power splitter, and signals concurrently received at each of the first and fourth input/output ports are split into first and second portions for transmission via the second and third input/output ports, respectively, and signals concurrently received at the second and third input/output ports are split into first and second portions for transmission via the first and fourth input/output ports, respectively.

7. A reflector arrangement comprising:
    a plurality of n first 2×2 power splitters, each first 2×2 power splitter comprising first, second, third, and fourth ports, the first port of each of the 2×2 power splitters being adapted to be coupled to receive an output signal from a separate corresponding one of a plurality of n remote signal sources and providing feedback signals thereto, where signals received at each of the first and fourth ports are split into first and second portions for transmission via the second and third ports, respectively, and signals received at each of the second and third ports are split into first and second portions for transmission via the first and fourth ports, respectively;
    a broadband second power splitter comprising first, second, third, and fourth ports, the second port serving as an output of the reflector arrangement, signals received at each of the first and fourth ports are split into first and second portions for transmission via the second and third ports, respectively, and a signal received at the third port is split into first and second portions for transmission via the first and fourth ports, respectively;

a first multiplexer/demultiplexer comprising a first filter spectral response, a plurality of n first ports, and a second port;

each of the plurality of n first ports being coupled to a second port of a corresponding one of the plurality of n first 2×2 power splitters, and the second port being coupled to the first port of the broadband second power splitter;

a second multiplexer/demultiplexer comprising a second filter spectral response, a plurality of n first ports, and a second port, each of the plurality of n first ports being coupled to the third port of a corresponding one of the plurality of n 2×2 first power splitters, and the second port being coupled to the third port of the broadband second power splitter; and a third multiplexer/demultiplexer comprising a third filter spectral response, a plurality of n first ports, and a second port, each of the plurality of n first ports being coupled to the fourth port of a corresponding one of the plurality of n first 2×2 power splitters, and the second port being coupled to the fourth port of the broadband second power splitter.

8. A reflector arrangement comprising:

first, second, and third power splitters, each power splitter comprising first, second, third, and fourth ports;

the first port of the first power splitter being coupled to receive a signal from a remote signal generating source, and to transmit a reflected signal back to the remote signal generating source, and the second, third, and fourth ports of the first power splitter being coupled to the first port of the second power splitter and the third and fourth ports of the third power splitter, respectively;

the second port of the second power splitter serving as an output of the reflector arrangement, and the third and fourth ports being coupled to the first and second ports of the third power splitter; and signals received at each of the first and fourth ports of each of the first, second, and third power splitters are split into first and second portions for transmission via the second and third ports, respectively, and signals received at each of the second and third port is split into first and second portions for transmission via the first and fourth ports, respectively.

9. The reflector arrangement of claim 8 further comprising a first transmission filter for filtering a signal passing therethrough with a predetermined first spectral response, the first transmission filter being coupled in a path between the second port of the first power splitter and the first port of the second power splitter.

10. The reflector arrangement of claim 9 further comprising a second transmission filter for filtering a signal passing therethrough with a predetermined second spectral response, the second transmission filter being coupled in a path between the third ports of the second and third power splitters.

11. The reflector arrangement of claim 10 further comprising a third transmission filter for filtering a signal passing therethrough with a predetermined third spectral response which is different than the first and second spectral responses, the third transmission filter being coupled in a path between the second port of the third power splitter and the fourth port of the first power splitter.

12. The reflector arrangement of claim 1 further comprising:

a second transmission filter comprising a second spectral response that is coupled between the third ports of the first and second power splitters; and a delay line that is coupled between the fourth ports of the first and second power splitters.

* * * * *